United States Patent
Takeno et al.

(10) Patent No.: US 6,428,925 B1
(45) Date of Patent: Aug. 6, 2002

(54) BATTERY PACK COMPRISING HOLLOW PORTION AND POWER TOOL USING THE SAME

(75) Inventors: Kazuta Takeno, Kawasaki; Yukinori Akamoto, Inba-gun; Haruhiko Tanaka, Yachiyo; Kazumi Sato, Zushi; Kiyoshi Ishitsuka, Yokohama; Hiroshi Kanasaki, Kawasaki, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/522,824

(22) Filed: Mar. 10, 2000

(30) Foreign Application Priority Data

| Mar. 12, 1999 | (JP) | ............ | 11-066732 |
| Oct. 14, 1999 | (JP) | ............ | 11-292538 |
| Nov. 9, 1999 | (JP) | ............ | 11-317823 |
| Nov. 9, 1999 | (JP) | ............ | 11-317824 |
| Nov. 26, 1999 | (JP) | ............ | 11-336189 |

(51) Int. Cl.$^7$ ............ H01M 2/02
(52) U.S. Cl. ............ 429/163; 429/159
(58) Field of Search ............ 429/148, 153, 429/154, 155, 163, 164, 176, 177, 151, 159

(56) References Cited

U.S. PATENT DOCUMENTS 2,185,829 A * 1/1940 Burgess ............ 429/163
2,742,520 A * 4/1956 Pucher et al. ............ 429/163

FOREIGN PATENT DOCUMENTS

| DE | 467419 C | 10/1928 |
| DE | 469132 C | 12/1928 |
| JP | 07130344 A | 5/1995 |

* cited by examiner

Primary Examiner—Patrick Ryan
Assistant Examiner—M. Wills
(74) Attorney, Agent, or Firm—Oblon, Spivak, McClelland, Maier & Neustadt, P.C.

(57) ABSTRACT

A battery pack having a plurality of battery cells stored side by side in a case. The case, in particular, includes a bottomed trough and a lid, the trough having a space as a cell storage portion defined between inner and outer wall portions paired to form a loop and a space as a hollow surrounded by the inner wall portion and penetrating the trough from top to bottom, the lid closing a top opening of the cell storage portion. The battery cells are arranged in a loop along the inner and outer wall portions, whereby a rise and variation in their temperature can be restrained.

16 Claims, 11 Drawing Sheets

BATTERY PACK COMPRISING HOLLOW PORTION AND POWER TOOL USING THE SAME

BACKGROUND OF THE INVENTION

1. Field of the Invention

The present invention relates to a battery pack including a plurality of battery cells stored in a case, and more specifically, to a battery pack capable of restraining a rise and variation in temperature of battery cells, thereby ensuring steady charging and reliable cell performance.

2. Description of the Prior Art

Nickel-metal hydride secondary battery cells are used as power sources for modern electro-vehicles, power-assisted bicycles, power tools, etc. Conventionally, the cells of this type are provided in the form of a battery pack in which a plurality of battery cells that are connected in series or parallel with one another are stored in a case that is formed of polycarbonate or ABS resin, for example.

In order to enjoy a compact general configuration, the conventional battery pack is designed so that the battery cells are stored most closely in contact with one another in a case, whereby the capacity efficiency is improved. In the case of columnar cells, twelve battery cells 1 are arranged alternately in three rows with their respective peripheral surfaces in contact with one another so as to minimize the storage capacity for them, and are stored in a rectangular case 2, as shown in FIG. 19, for example.

In the battery pack of this conventional construction, variation in temperature is easily caused between the battery cells 1 that are arranged along the wall surface of the case 2 and the ones that are located in the central portion. Although heat generated in the cells 1 that are arranged along the case wall surface can be readily released through the wall surface, heat produced in the central cells is liable to be accumulated therein. The variation in the cell temperature causes dispersion in the properties (capacities, in particular) of the individual battery cells 1. If the battery pack is used with the battery cells 1 subject to the dispersion in properties, the respective capacities of the cells 1 are gradually exhausted, the smallest one first. The exhausted battery cells 1 may undergo some troubles, such as pole reversal, increase in internal resistance attributable to dissipation of the electrolyte solution, etc. The dissipation of the electrolyte solution is attributed solely to gas discharge from a relief valve that occurs as the internal pressure of the battery cells 1 increases. In consequence, troubles may be caused including lowering of the cell properties, failure of recharge, etc. Thus, the battery pack is lowered in performance, and its life is shortened.

In the case where the battery cells 1 are nickel-metal hydride secondary battery cells, they generate great heat as they are charged. The battery cells 1 generate particularly intensive heat when they are charged with high current in a short period of time. Further, the charging efficiency and cell capacity of the nickel-metal hydride secondary battery cells lower as the cell temperature increases. As the cell temperature rises, moreover, a hydrogen-storing alloy that forms a negative electrode easily corrodes in the electrolyte solution, so that its hydrogen occluding/releasing capacity lowers. It is essential, therefore, to prevent the rise in temperature of the battery cells (nickel-metal hydride secondary battery cells) 1 in the case 2, especially when the cells are charged.

Since the power tool are handled roughly, in general, the battery pack that is used as its power source is expected to be structurally resistant to external impact such as drop impact.

SUMMARY OF THE INVENTION

An object of the present invention is to provide a battery pack capable of preventing or restraining a rise and variation in temperature of battery cells stored in a case, thus fulfilling its cell performance.

Another object of the invention is to provide a battery pack capable of being safely charged in a manner such that a rise in temperature of cells is effectively restrained during the charge.

Still another object of the invention is to provide a power tool capable of effectively cooling a battery pack.

According to the present invention, there is provided a battery pack having a plurality of battery cells stored side by side in a case, the case including a bottomed trough and a lid, the trough having a space as a cell storage portion defined between inner and outer wall portions paired to form a loop and a central space as a hollow surrounded by the inner wall portion and penetrating the trough from top to bottom, the lid closing a top opening of the cell storage portion. Heat generated in the battery cells is released through the hollow from the inner wall portion the trough as well as from the outer wall portion. Thus, the rise and variation in temperature of the battery cells can be restrained.

Preferably, the trough is designed so that the pillar-shaped battery cells stored in the cell storage portion are arranged side by side in a loop with their respective outer peripheral surfaces in contact with one another, so that heat in the battery cells can be released through the outer and inner wall portions. Heat generation during charge can be effectively restrained even in the case where a nickel-metal hydride secondary battery cell is used as each battery cell.

The battery pack according to the invention may further comprise a terminal block overlying the battery cells stored in the cell storage portion of the trough and having electrode leads of the group of battery cells led out therefrom, and may be designed so that the lid has apertures in those regions thereof which face the electrode leads, through which the electrode leads are exposed for external connection.

Preferably, electrode leads of the terminal block are arranged in a region opposite the hollow. The apertures through which the electrode leads are exposed for external connection are arranged along the inner peripheral portion of the lid opposite the hollow.

In particular, the terminal block is provided with a pair of electrode lead terminals, positive and negative, connected individually to the electrode leads of the cell group and one or a plurality of auxiliary terminals for the cell group.

The auxiliary terminals are used when the cell group is charged. More specifically, they include a terminal for charging connected in series with the cell group through temperature protection elements for cutting off a charging path for the cell group in response to the temperature of the cells, a terminal for temperature detection connected to a temperature transducer for detecting the cell temperature, and a terminal for cell type identification connected to a resistor having a resistance value corresponding to the specifications of the cells.

The temperature protection elements are provided individually in a plurality of spots in the direction of arrangement of the battery cells stored in a loop in the cell storage portion of the trough. They are interposed in series between the cell group and the charging terminal.

The inner wall portion of said trough is inclined outward from the base portion thereof to the top opening, whereby the sectional area of the top opening of the hollow surrounded by the inner wall portion is reduced gradually. By reducing the sectional area in this manner, a current of air circulating in the hollow can be speeded up on the upper end side, whereby the cooling efficiency can be enhanced. In this case, the inner wall portion should be inclined at an angle of 0.5° to 5° to the vertical direction. Further, the inner and outer wall portions of the trough should only be as high as the cylindrical battery cells.

The battery pack constructed in this manner may be attached integrally to, e.g., the lower part of a handgrip portion of a power tool to be used as a power source thereof. It is to be desired that the cooling efficiency for the cell group should be enhanced by circulating air in the hollow of the battery pack by utilizing the rotation of a motor.

According to the present invention, there may be provided a battery pack that can store a plurality of battery cells with structural stability and restrain a rise and variation in temperature of the battery cells, thus fulfilling its cell performance. Further, the charging state of the battery cells, especially the cell temperature, can be observed as the charge of the battery cells is safely controlled.

Since the battery cells can be kept stable, moreover, the resulting battery pack has a structure that is highly resistant to external impact and the like, and the power tool is easy to handle.

DETAILED DESCRIPTION OF THE INVENTION

A fundamental configuration of a battery pack according to the present invention will first be described with reference to FIGS. 1 and 2.

Figure 1:
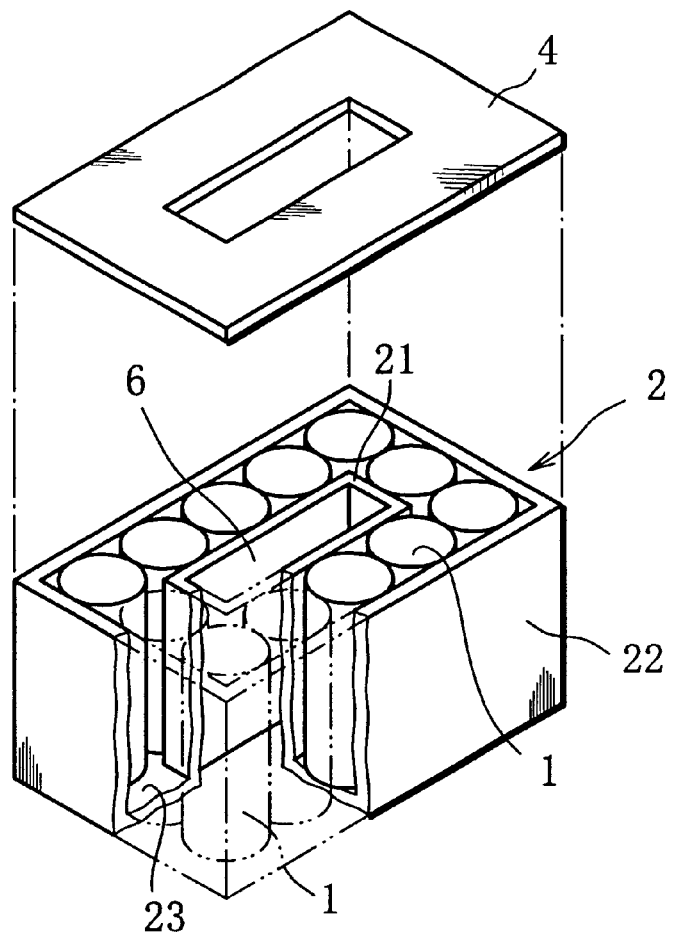
FIG. 1 is an exploded cutaway perspective view showing a fundamental configuration of a battery pack according to the present invention.
Figure 2:
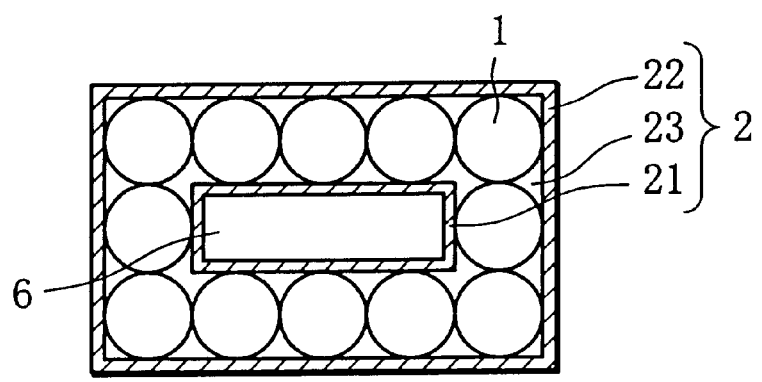
FIG. 2 is a plan view showing the way battery cells of the battery pack shown in FIG. 1 are stored in a trough.

FIG. 1 is an exploded cutaway perspective view showing an arrangement of a battery pack according to the present invention. FIG. 2 is a plan view illustrating the way a plurality of battery cells 1 are stored in a case 2. The case 2 is formed of a bottomed trough in the shape of a substantially rectangular loop. The case 2 has inner and outer wall portions 21 and 22 opposed to each other and a base portion 23 that connects the respective lower end portions of the wall portions 21 and 22. The height of each wall portion of the case 2 is substantially equal to or a little greater than the height (axial length) of each columnar battery cell 1. The width of the base portion 23 of the case 2 is substantially equal to the outside diameter of each battery cell 1. The inside space of the bottomed trough forms a cell storage space in which a plurality of battery cells 1 (e.g., 12 cells) are arranged in a looped line such that their respective peripheral surfaces are in contact with one another. A central space that is surrounded by the inner wall portion 21 of the trough (case 2) forms a hollow 6 that vertically penetrates the trough.

The battery cells 1, in which electrodes are wired in a regular manner, are stored in the trough (case 2). In this state, the peripheral surface of each battery cell 1 is in contact with the inner or outer wall portion 21 or 22, or preferably, with both the wall portions 21 and 22. More specifically, each of those battery cells 1 which are situated individually at the four corners of the case (trough) 2 in the rectangular loop is in contact (at two points) with each corresponding two adjacent sides of the outer wall portion 22, as shown in FIG. 2. Each of the remaining battery cells 1 that are situated between the corner battery cells 1 is in contact (at two points) with the inner and outer wall portions 21 and 22.

A top opening of the case 2 that is stored with the battery cells 1 or the top portion of the cell storage space is closed by means of a lid 4 that has substantially the same shape with the top opening. The battery cells 1 are sealed between the case 2 and the lid 4, whereupon a sealed battery pack is realized. Electrode leads of the battery pack are led out through the lid 4, for example.

According to the battery pack in which the battery cells 1 are arranged in a line in the case 2, the cells 1 are in contact with both the inner and outer wall portions 21 and 22. If the battery cells 1 are heated during use (charge and discharge), therefore, heat in each cell 1 can be smoothly released through the inner and outer wall portions 21 and 22. In consequence, heat release from the battery cells 1 advances substantially equally, so that variation in the cell temperature can be restrained. Since heat in each cell 1 is released through the inner and outer wall portions 21 and 22, moreover, the heat release efficiency is high enough, and a rise in the cell temperature can be restrained effectively. Thus, according to the battery pack of the invention, the battery cells 1 can be made substantially equal in charging efficiency and therefore, in cell capacity, so that the life performance of the battery pack can be improved.

According to the present invention, furthermore, the sealed battery pack ensures a dustproof effect. Even in the case where the battery pack is used as a power source for a power tool, therefore, metal cuttings cannot get into the battery pack on the scene of labor, so that short-circuiting between the battery cells 1 can be prevented securely. Further, some other components can be incorporated in the battery pack by utilizing the hollow 6.

Since the battery cells 1 in the battery pack generate substantial heat as they are charged, it is advisable compulsorily to introduce air into the hollow 6 to air-cool the inner wall portion 21 during the charge. Preferably, in this case, the inner wall portion 21 should be formed of a metallic material that has a high heat transfer coefficient. Even in the case where the inner wall portion 21 is formed of a resin material, its heat release effect can be further improved if its surface is coated with a high-transfer paint.

Figure 3:
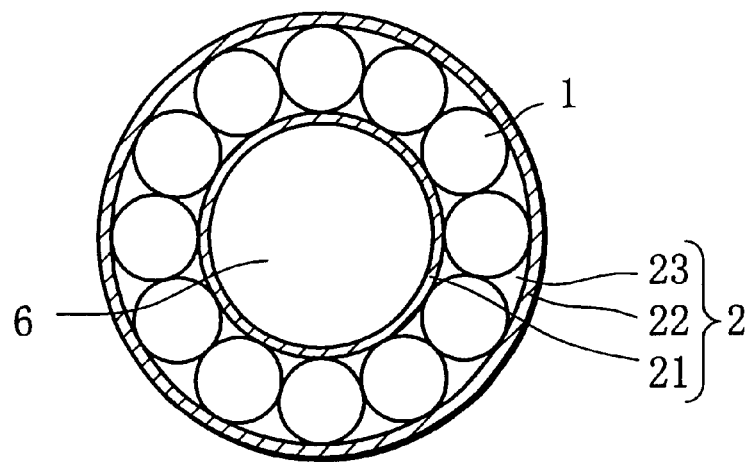
FIG. 3 is a plan view showing the way battery cells of another example of the battery pack of the invention are stored in a trough.

In the example described above, the case 2 has a substantially rectangular external appearance. Alternatively, however, the battery pack may be constructed so that a plurality of battery cells 1 are stored in an annular case 2, as shown in FIG. 3. In this case also, a trough-shaped space surrounded by inner and outer wall portions 21 and 22 of the case 2 forms an annular cell storage space, and a central space surrounded by the inner wall portion 21 forms a hollow 6. The battery cells 1 are arranged in a line so that they are in contact with the inner and outer wall portions 21 and 22. The battery pack should be constructed in like manner in the case where the case 2 is elliptic.

Figure 4:
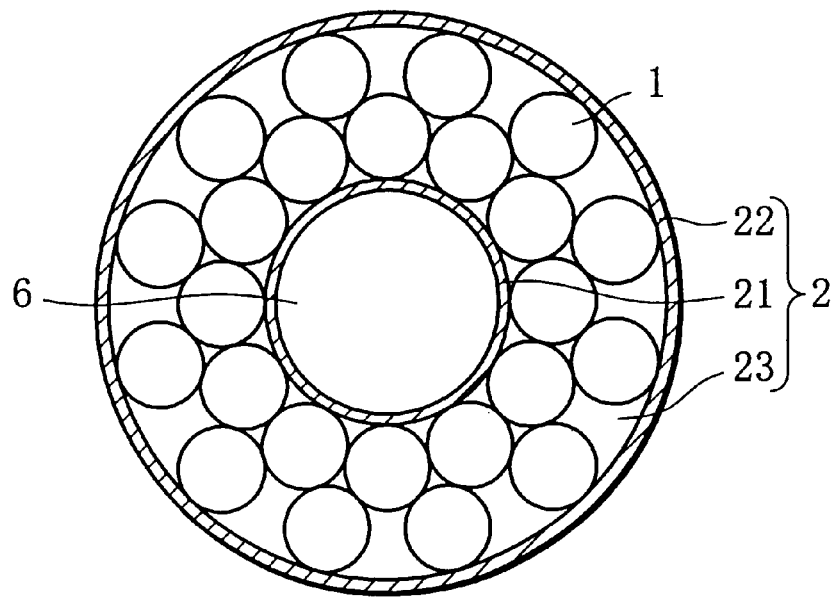
FIG. 4 is a plan view showing the way battery cells of still another example of the battery pack of the invention are stored in a trough.

As shown in FIG. 4, moreover, an annular case 2 may be designed so that a plurality of battery cells 1 are arranged in a line along an inner wall portion 21 of the case 2 and additional battery cells 1 are arranged in another line along an outer wall portion 22 of the case 2 outside the inner cells. Thus, it is necessary only that a plurality of battery cells 1 arranged in two annular lines never fail to be in contact with the inner or outer wall portion 21 or 22.

Figure 5:
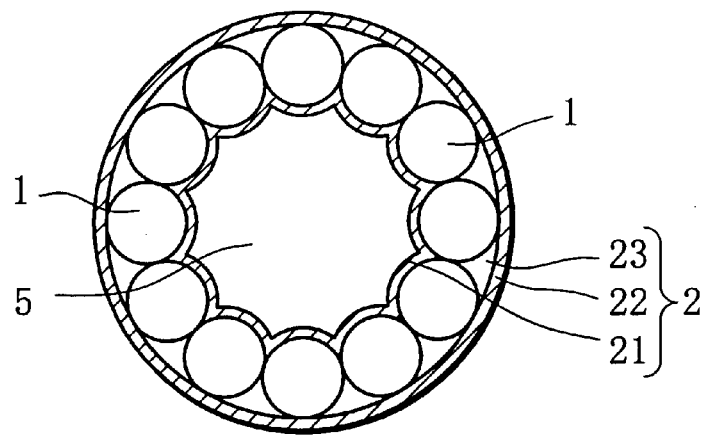
FIG. 5 is a plan view showing the way battery cells of a further example of the battery pack of the invention are stored in a trough.

In consideration of the fact that the inner wall portion 21 touches the external space in a smaller area than the outer wall portion 22, the surface of the inner wall portion 21 may be undulated so that it can be widely in contact with the respective peripheral portions of a plurality of battery cells 1 that are arranged in a loop, as shown in FIG. 5, for example. By doing this, the heat release effect of the inner wall portion 21 can be improved. The heat release effect can be freely adjusted by suitably designing the area of contact between the inner wall portion 21 and the peripheral portion of each battery cell 1. The area of contact between the outer wall portion 22 and the peripheral portion of each battery cell 1 can be also adjusted by suitably shaping the surface of the inner wall portion 21.

Figure 6:
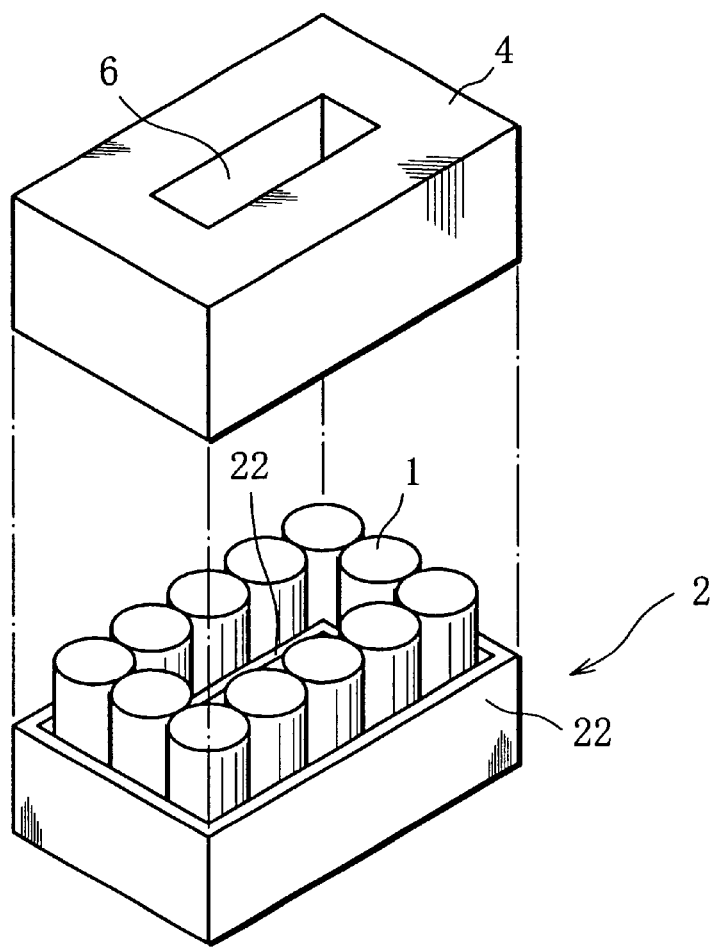
FIG. 6 is an exploded perspective view showing another configuration of the battery pack of the invention.

In the example described above, moreover, the height of the case (trough) 2 is substantially equal to that of each battery cell 1. As shown in FIG. 6, however, the case 2 may be made to be half as high as each battery cell 1, and a battery pack may be constructed using a lid (trough) 4 that has the same shape as the case 2. After the battery cells 1 are stored in the one trough (case 2), in this case, the two troughs (case 2 and lid 4) are butted against and bonded to each other to cover the cells 1.

Figure 7:
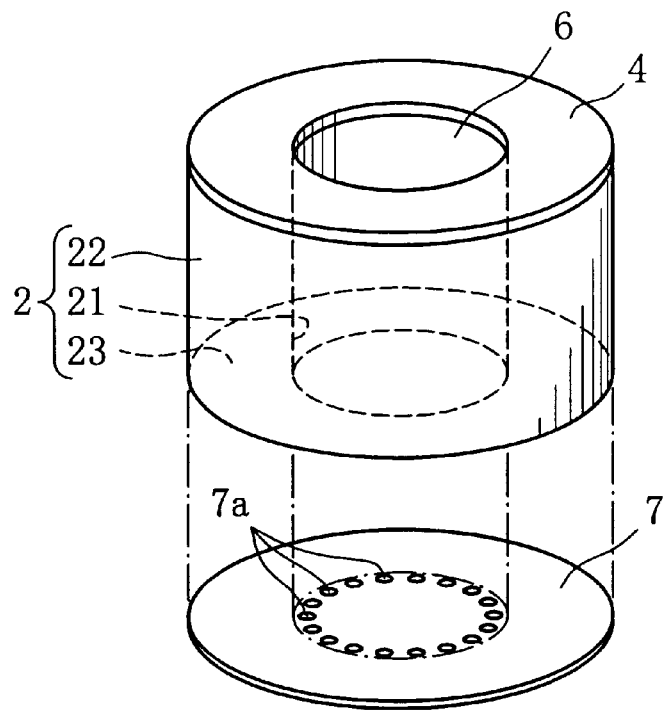
FIG. 7 is an exploded perspective view showing still another configuration of the battery pack of the invention.
Figure 8:
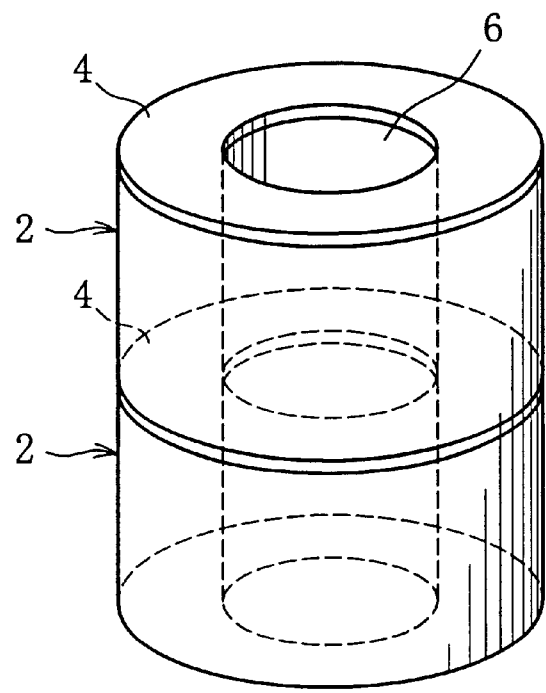
FIG. 8 is an exploded perspective view showing a further configuration of the battery pack of the invention.

In the case where a base plate 7 is expected to be attached to the underside of the battery pack, an aperture (not shown) having the same shape as the hollow 6 may be formed in the central portion of the base plate 7. As shown in FIG. 7, however, a plurality of holes 7a may be formed along the inside of an inner wall portion 21 of a case 2. It is to be understood, moreover, that a plurality of battery packs may be stacked in layers (two layers in FIG. 8) to form a battery pack assembly, as shown in FIG. 8.

In order to confirm the effect of the battery pack constructed in this manner, the inventors hereof manufactured an annular battery pack A shown in FIG. 5 by way of trial, using twelve nickel-metal hydride secondary battery cells of the 4/5A size (nominal capacity: 1,700 Ah) having a diameter of 17 mm and a height of 43 mm as battery cells 1. Polycarbonate resin was used for an annular case (trough) 2 that constitutes the battery pack A. The outside diameter of the case 2 was 88 mm, the diameter of a hollow 6 was 42 mm, and the respective thicknesses of outer and inner wall portions 22 and 21 were 3 mm. The battery cells 1 were arranged in a line so that they were in contact with the inner wall portion 21.

Figure 19:
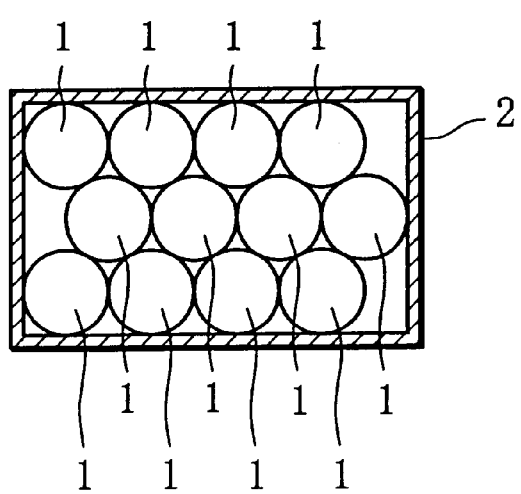
FIG. 19 is a plan view showing the way battery cells of a conventional battery pack are stored in a case.

For comparison, a battery pack B of a conventional construction shown in FIG. 19 was manufactured by way of trial, using twelve battery cells 1 of the same type. This battery pack B includes a box-shaped case of polycarbonate resin, having a wall portion thickness of 3 mm, length of 52.4 mm, and width of 82.5 mm.

These battery packs A and B were rapidly charged with a constant current of 4.5 A at an initial temperature (ambient temperature) of 27° C. for 20 minutes, and thereafter, supplementally charged with a constant current of 0.8 A for 15 minutes. Then, temperatures of each battery cell 1 reached on completion of the rapid charge and the supplementary charge were measured. Thereupon, the temperature of each battery cell 1 in the battery pack A reached on completion of the rapid charge increased from the initial temperature by about 16° C., that is, to a substantially fixed temperature of about 44° C. The temperature of each cell 1 reached on completion of the supplementary charge was at a substantially fixed temperature of 46° C.

In contrast with this, the temperature of each battery cell 1 in the battery pack B of the conventional construction reached on completion of the rapid charge increased from the initial temperature within the range of 16 to 22° C., thus undergoing a variation of 43 to 49° C. The temperature of each battery cell 1 reached on completion of the supplementary charge was also subject to a variation of 48 to 52° C.

On the other hand, the battery packs A and B, charged in the aforesaid manner, were rapidly discharged by continuous pulse discharge of 10 A for 30 seconds at a time with quiescent periods of 30 seconds, and the temperature of each battery cell 1 reached on completion of the rapid discharge was measured. Thereupon, the temperature of each battery cell 1 in the battery pack A reached on completion of the rapid discharge was at a substantially fixed temperature of 48° C., while the temperature of each battery cell 1 in the battery pack B reached on completion of the rapid discharge was subject to a substantial variation of 45 to 51° C.

Further, the battery packs A and B were charged with a constant current of 1.7 A, and the completion of charge was detected under $-\Delta V$ control. Thereafter, the cell life performance was examined by a cycle life test in which forced discharge was carried out at 12 A in a cycle such that the termination voltage was at 9.6 V (0.8 V for each battery cell). In the $-\Delta V$ control, the completion of charge was confirmed when a voltage drop of 120 mV (10 mV for each battery cell) from the peak of the charging voltage of the battery packs A and B was detected after the peak voltage was reached. According to this cycle life test, the cell performance of the battery pack A was ensured at 500 cycles and below, while the cell performance of the battery pack B lowered at 350 cycles.

According to the battery pack of the construction of the invention, as seen from these experimental results, the temperature rise of the battery cells 1 was able to be restricted to a level below the initial temperature, and the variation in the cell temperature was able to be restrained effectively. According to this battery pack, moreover, the charging efficiency of the battery cells 1 was high enough, and the temperature of the cells 1 was subject to no variation. Thus, the properties of each battery cell 1 (cell performance) can be securely bought out to ensure higher life performance.

The following is a description of a specific embodiment of the battery pack according to the present invention. In this battery pack, twelve columnar nickel-metal hydride secondary battery cells (battery cells 1) are connected in series with one another and stored in a case 2.

Figure 9:
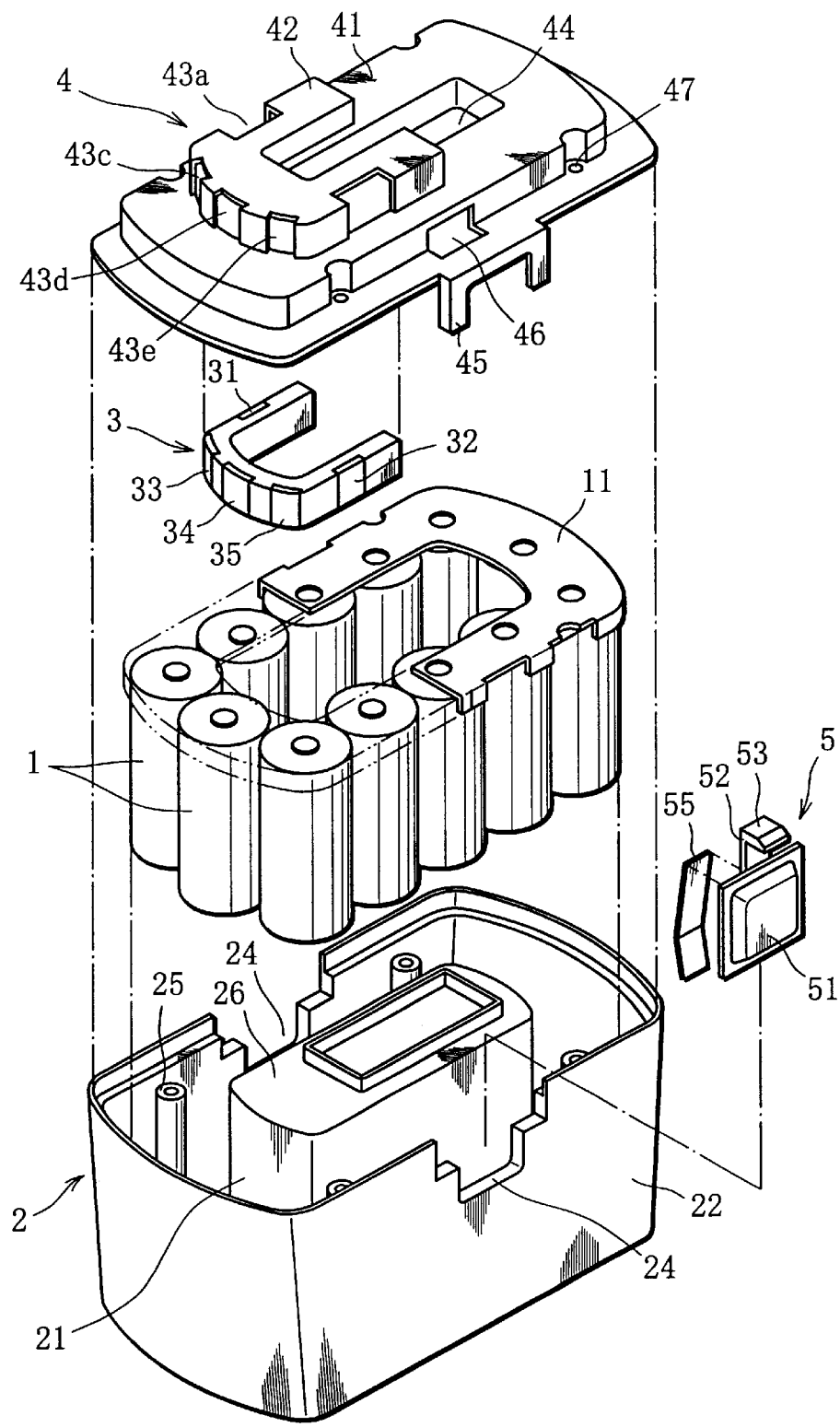
FIG. 9 is an exploded perspective view showing an outline of a battery pack according to a first embodiment of the invention.

FIG. 9 is an exploded perspective view showing an outline of the battery pack according to this embodiment. In FIG. 9, numerals 1 and 2 denote, respectively, the twelve columnar nickel-metal hydride secondary battery cells for use as battery cells and the case in which the cells 1 are arranged side by side. Numeral 3 denotes a terminal block that overlies the cells 1, and 4 denotes a lid for closing the top opening of the case 2.

Figure 10:
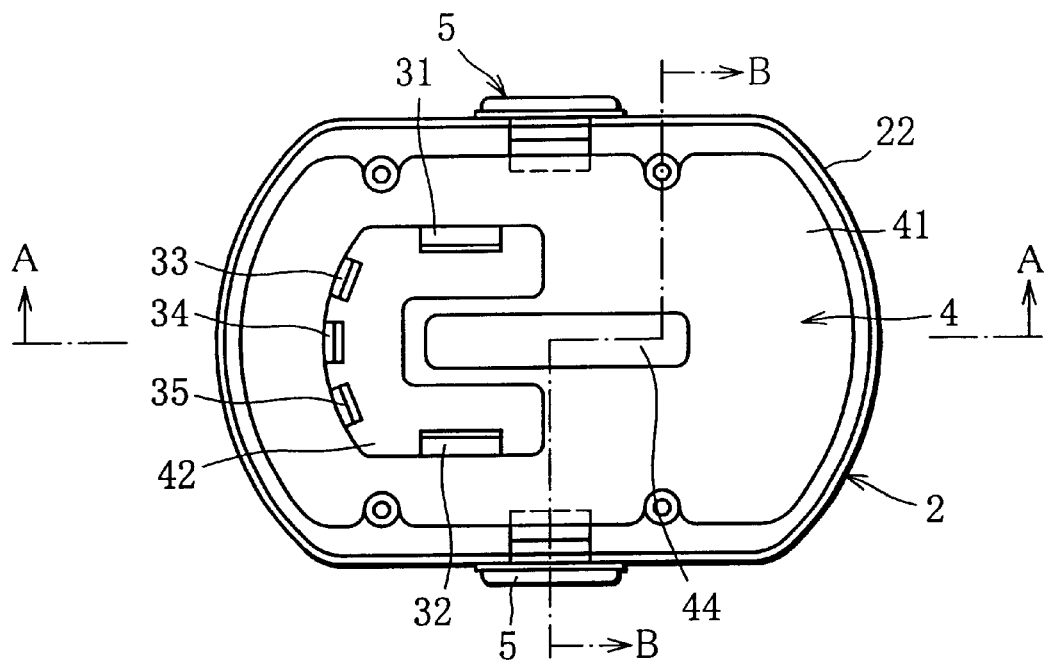
FIG. 10 is a plan view of the battery pack shown in FIG. 9.
Figure 11:
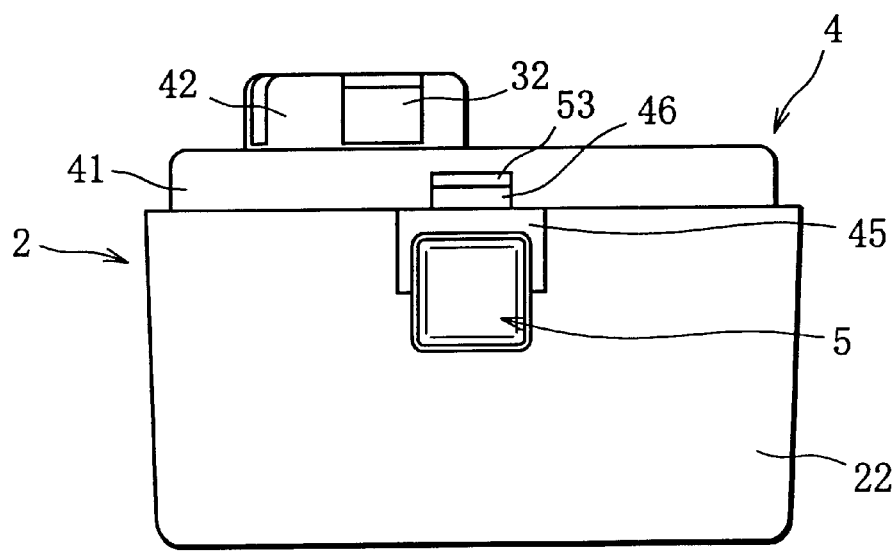
FIG. 11 is a side view of the battery pack shown in FIG. 9.
Figure 12:
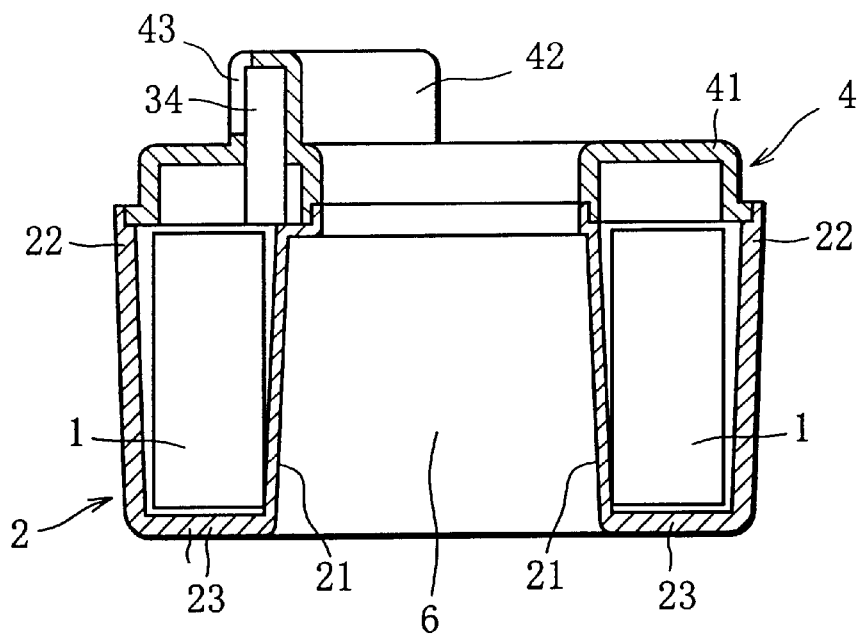
FIG. 12 is a sectional view of the battery pack taken along line A—A of FIG. 10.
Figure 13:
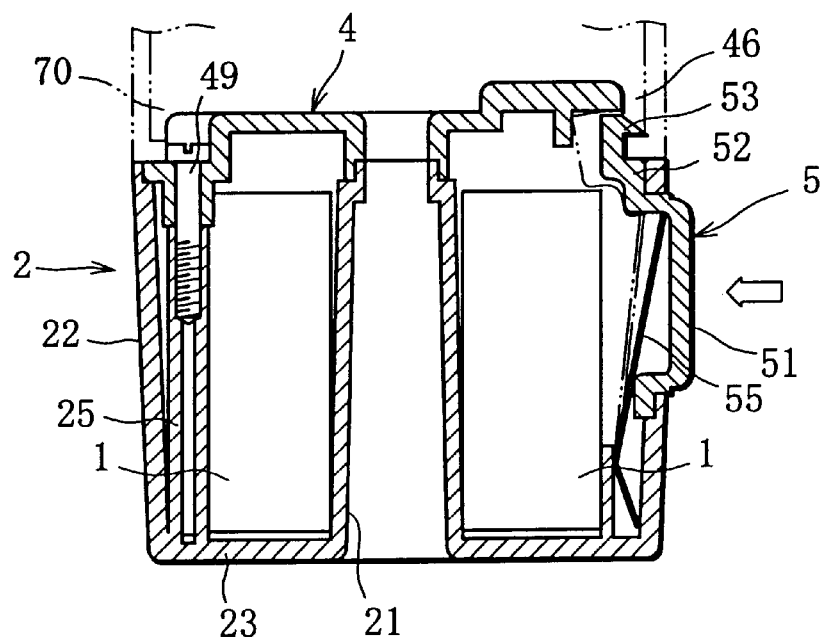
FIG. 13 is a sectional view of the battery pack taken along line B—B of FIG. 10.

FIG. 10 is a plan view showing the top structure of the battery pack shown in FIG. 9, and FIG. 11 is a side view of the battery pack. FIG. 12 is a sectional view taken along line A—A of FIG. 10, and FIG. 13 is a sectional view taken along line B—B of FIG. 10.

The case 2 is formed by injection-molding polycarbonate or ABS resin, for example. The case 2 includes inner and outer wall portions 21 and 22 that are formed by connecting the respective opposite end portions of a pair of parallel portions by means of curved portions, thereby making an oval loop. The wall portions 21 and 22 are connected to each other by means of a base portion 23, thus forming a bottomed trough having a cell storage space in the shape of a corridor. The inside portion of the trough that forms the corridor-shaped storage space, that is, the central portion of the case 2 that is surrounded by the inner wall portion 21, forms a hollow 6 that penetrates the trough from top to bottom.

The height of the inner and outer wall portions 21 and 22 that define the cell storage space or the depth of the trough that forms the storage space is a little greater than the height (length) of each columnar battery cell 1. The width of the base portion 23 is a little greater than the diameter of each battery cell 1. The respective upper end portions of the wall portions 21 and 22 are inclined outward at an angle of about 0.5° to 5° so that the wall portions can be easily released from molds for injection molding. As the inner wall portion 21 is inclined in this manner, moreover, the sectional area of the hollow 6, which is surrounded by the inner wall portion 21, is gradually reduced upward. Each columnar battery cell 1, which is of the 4/5A size, has a diameter of 17 mm and a height of 43 mm, for example.

Twelve battery cells 1 are stored side by side in a loop in the trough-shaped cell storage space of the case 2 so that their respective peripheral surfaces are in contact with one another. More specifically, five battery cells 1 are arranged side by side in the longitudinal direction in each of two rows, and one battery cell 1 is located at each end portion between the two rows in a manner such that it is somewhat outwardly eccentric. Thus, the battery cells 1, twelve in total, are arranged in an oval loop.

A notch 24 for a stopper 5 (mentioned later) is formed in each of two longitudinal sides of the outer wall portion 22. Inside the trough-shaped cell storage space, four screw bosses 25 are arranged along the outer wall portion 22. The bosses 25 are formed by utilizing spaces beside the columnar battery cells 1 that are stored in the storage space with their respective peripheral surfaces in contact with one another. The bosses 25 are located lest they hinder the storage of the battery cells 1. The bosses 25 rather restrict the respective storage positions of the cells 1, thereby preventing the cells 1 from becoming shaky.

A flange 26 is provided on the upper end portion of the inner wall portion 21 so as to extend outward from the trough-shaped cell storage space. In other words, the flange 26 projects toward the hollow that is formed in the central portion of the case 2. The flange 26 serves to support the terminal block 3 on its top portion and support the central portion of the lid 4 from below by being fitted therein, as mentioned later.

On the other hand, the battery cells 1 that are stored in the trough-shaped cell storage space of the case 2 are arranged in a loop along the storage space, as mentioned before. The battery cells 1 are connected in series by means of leads (not shown). The upper end portion of the looped row of the battery cells 1 is covered by a cover member 11 that is formed of an insulating material, for example, whereby the configuration of the row is kept stable.

The terminal block 3 that overlies the battery cell row is a substantially U-shaped block of an insulating material. A pair of electrode lead terminals 31 and 32, positive and negative, are provided individually in the opposite side portions of the terminal block 3 in the longitudinal direction of the row of battery cells that are arranged in a loop. Further, three auxiliary terminals 33, 34 and 35 are provided in a curved side portion that extends in the crosswise direction and connects the opposite side portions. Electrode leads of a set battery that is composed of a plurality of series-connected battery cells 1 are connected to the positive and negative electrode lead terminals 31 and 32, individually. The three auxiliary terminals 33, 34 and 35, which are used to charge the battery cells 1, are connected individually to electrode leads of the set battery through resistors incorporated in the terminal block 3 and thermistors and thermostats in the respective peripheral surfaces of the looped battery cells 1. The respective functions of the auxiliary terminals 33, 34 and 35 will be described later with reference to FIG. 14.

The lid 4 that closes the top opening of the case 2 is located covering the battery cell row in the case 2 and the terminal block 3 overlying the same. The lid 4 includes a substantially flat body portion 41, adapted to be fitted on the respective upper end portions of the inner and outer wall portions 21 and 22 of the case 2, and a projection 42 formed by partially raising that region of the body portion 41 which faces the terminal block 3. A storage space for the terminal block 3 is formed on the back side of the projection 42. A side wall portion of the projection 42 is provided with five rectangular apertures 43 (43a, 43b, 43c, 43d and 43e) through which the electrode lead terminals 31 and 32 and the three auxiliary terminals 33, 34 and 35 are exposed for external connection. Beside the projection 42, an aperture 44 for communication with the hollow of the case 2 is formed in the central portion of the body portion 41. Further, pendent walls 45 are formed individually on two longitudinal side portions of the body portion 41. The walls 45, in cooperation with the notches 24 in the outer wall portion 22 of the case 2, define substantially rectangular apertures for the stoppers 5. More specifically, the pendent walls 45 are fitted individually in the respective upper parts of the notches 24, thereby forming the apertures, when the lid 4 is put on the top opening of the case 2.

Screws 49 are used to fix the lid 4 to the case 2 that stores the battery cells 1. The screws 49 are passed individually through holes 47 in the body portion 41 from above the lid 4 and fitted individually into the respective top portions of their corresponding bosses 25. If necessary, packing members (not shown) are interposed between the lid 4 and the respective upper end portions of the inner and outer wall portions 21 and 22 of the case 2, whereby the cell storage space is hermetically closed.

The following is a description of the stoppers 5 that are fitted in the apertures defined between the notches 24 network structure the pendent walls 45. Each stopper 5 is composed of a push portion 51, in the form of a substantially rectangular projection, and an arm portion 52 that extends from a side portion of the push portion 51. The arm portion 52 has a hook 53 on its distal end. As shown in FIG. 13, each stopper 5 is fitted into its corresponding aperture from the back side so that its hook 53 projects from each corresponding hook hole 46 in the lid 4. The stopper 5 is supported in a manner such that it is urged outward from the case 2 by means of a plate spring 55 on the back side. When the stopper 5 is pushed by a finger or the like, it is depressed inward to cause the hook 53 to submerge in the hook hole 46.

Each hook 53 can engage its corresponding engaging projection on an enclosure 70 of the power tool to which the battery pack is to be attached, thereby ensuring the attachment of the battery pack to the tool. Thus, the upper part or the lid 4 of the battery pack serves as a mounting portion to be attached to the lower part of the enclosure 70 of the power tool. The battery pack can be attached at a stroke to the power tool in a manner such that each hook 53 in engagement with the engaging projection is elastically depressed inward. In detaching the battery pack, each push portion 51 is pushed in to force the hook 53 inward. Thereupon, the hook 53 is disengaged from its corresponding engaging projection on the enclosure 70 of the power tool, so that the battery pack can be removed downward from the enclosure 70.

Figure 14:
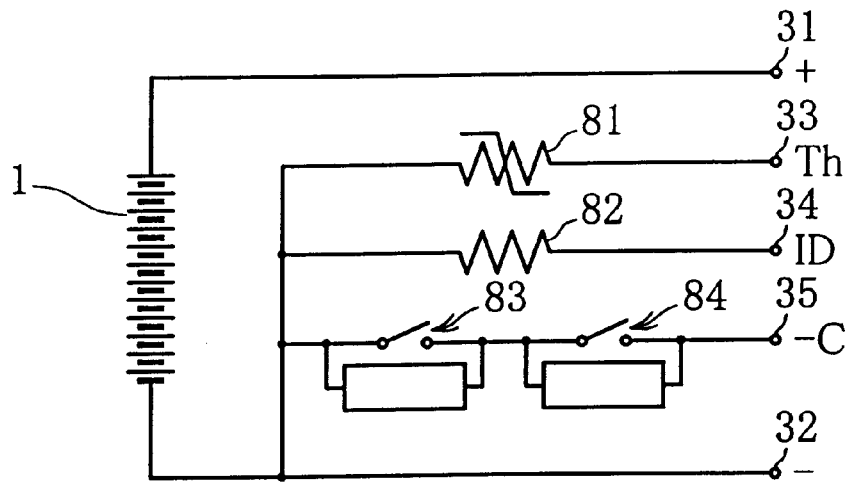
FIG. 14 is a diagram showing the electrical connection of the battery pack shown in FIG. 9.

On the other hand, the thermistors, resistors, and thermostats in the terminal block 3 serve to ensure the safety of the battery pack during the charge. FIG. 14 shows an electrical configuration of the battery pack. As shown in FIG. 14, the battery cells 1 are connected in series with one another, and the positive and negative electrode leads on the opposite ends are connected to the electrode lead terminals 31 and 32, respectively. The battery pack is connected to a load, such as an electric motor of the power tool, through the positive and negative electrode lead terminals 31 and 32.

A thermistor 81 in the case 2 is a temperature transducer that is used to determine the surface temperature of the battery cells 1. The thermistor 81 is interposed between the auxiliary terminal (Th) 33 and the electrode lead terminal 32. While the battery pack is being charged, the resistance value of the thermistor 81 is monitored to observe the temperature of the battery cells 1. The thermistor 81 is pasted on the peripheral surface of a predetermined one of the battery cells 1.

A resistor 82, which is interposed between the auxiliary terminal (ID) 34 and the electrode lead terminal 32, has a resistance value corresponding to the specifications of the battery pack. By determining the resistance value of the resistor 82, the number of series-connected battery cells 1, their current capacity, etc. can be obtained as ID information. Overcharge and the like can be prevented by controlling the charge of the battery pack according to the ID information. Thus, despite the uniform external appearance, the battery pack sometimes may vary in internal configuration, including the number of battery cells 1 therein. The battery pack is charged in optimum conditions based on electrical specifications that are obtained from the ID information.

Further, the auxiliary terminal 35, which can be used in place of the electrode lead terminal 32 during the charge of the battery pack, is charged in a manner such that charging current is supplied between the electrode lead terminal 31 and the auxiliary terminal 35. Temperature protection elements or two thermostats 83 and 84 are interposed in series between the auxiliary terminal 35 and the negative side (electrode lead terminal 32) of the battery cells 1. The thermostats 83 and 84 enable the battery pack to cut off its own charging path in response to the cell temperature. The thermostats 83 and 84 are pasted individually on the respective peripheral surfaces of those battery cells 1 which constitute the two curved side portions, in the direction of arrangement of the looped battery cells 1. The thermostats 83 and 84 are actuated to cut off the charging path if the temperature of any of the looped battery cells 1 rises.

A charger that is connected to the terminal block 3 and serves to charge the battery pack observes the charging state of the battery cells 1 (battery pack) through the auxiliary terminals 33, 34 and 35 as it controls the charging current, charging time, etc. Thus, the charger can efficiently charge the battery pack with stability. In case the cell temperature rises despite the charge control for the battery pack, the thermostats 83 and 84 can protect the battery cells 1 (battery pack) by cutting off the charging path of the battery pack.

Thus, according to the battery pack constructed in this manner, the battery cells 1 are arranged side by side in a loop between the inner and outer wall portions 21 and 22 of the battery cell 1 in the form of a looped corridor, so that heat produced in each battery cell 1 can be efficiently discharged through the wall portions 21 and 22. Since the outside of the inner wall portion 21 in the central portion of the case 2 forms a hollow that vertically penetrates the case 2, moreover, heat from the battery cells 1 can be discharged very effectively through the hollow. Since the sectional area of the hollow is gradually reduced toward the upper end, in particular, the moving speed of air that is introduced through the lower part of the hollow and ascends is higher on the upper end side, so that the cooling efficiency can be improved.

Since the battery cells 1 are arranged in a loop, furthermore, the heat release effect for the battery cells 1, compared with battery cells of a conventional array configuration, can be substantially equalized. Accordingly, the temperature rise of the battery cells 1 can be effectively prevented to restrain variation in the cell temperature. Thus, the performance of each battery cell 1 can be fulfilled to improve the cell performance for the battery pack.

Further, the terminal block 3 overlies the battery cell 1 that are stored in a loop in the case 2, and the electrode leads are led out through the terminal block 3, so that the electrode leads can be equalized in length. Each electrode lead can be shortened as the terminal block 3 is located over each end portion of a set battery that includes series-connected battery cells 1. Thus, a loss in resistance that is caused by the electrode leads can be minimized. It electrode leads are arranged along the inner wall portion 21, moreover, they can be effectively protected against external impact or the like that acts on the case 2, so that the mechanical or structural stability of the battery pack can be fully enhanced.

As mentioned before, moreover, the battery pack is provided with the auxiliary terminals 33, 34 and 35 that are connected to one another through the thermostats 83 and 84, as well as the thermistor 81 and the resistor 82. Accordingly, the specifications of the battery pack can be identified according to the auxiliary terminals 33, 34 and 35 and the cell temperature can be observed as the charged of the battery pack is controlled. Thus, the battery pack can be safely charged without entailing an increase in the battery temperature. If the charge control is delayed when the cell temperature increases, either of the thermostats 83 and 84 that are located along the looped battery cells 1 can cut off the charging path in response to the cell temperature. Thus, double safe measures can be taken for the charge.

The battery pack with the aforesaid construction is designed so that the lid 4 can be attached to the enclosure 70 of the power tool or the like, and the case 2 is mounted on the enclosure 70 with the lid 4 between them. Therefore, the lid 4 cannot be removed from the case 2 unless the battery pack is disengaged from the enclosure 70. Thus, there is no possibility of the lid 4 unexpectedly slipping off during the operation of the power tool.

Further, the projection 42 of the lid 4, which projects forming the storage space for the terminal block 3 on the back side, is attached to the enclosure 70 so as to be covered thereby. In its operating state, therefore, the battery pack has an external appearance that is free from any projections. If the outer peripheral surface of the case 2 or the corner portions of the outer wall portion 22 and the boundaries between the outer wall portion 22 and the base portion 23, in particular, are curved, the battery pack can enjoy a smooth entire shape without regard to the presence of the projection 42 on the lid 4. Thus, the handleability of the battery pack can be improved.

The projection 42 need not be very high only if it can hold the terminal block 3 on its back side and allows the electrode lead terminals 31 and 32 and the auxiliary terminals 33, 34 and 35 to be exposed for external connection through its side wall surface. Accordingly, the height of the projection 42 of the lid 4 can be restricted with ease, so that the entire structure can be made compact. Further, the resulting structure can be highly resistant to external impact.

The power tool furnished with the battery pack constructed in this manner may be designed so that a built-in fan is driven to cause air to flow into its motor through the hollow of the case by utilizing the rotatory force of the motor. According to this arrangement, the motor of the power tool can be cooled in a manner such that the battery pack itself is cooled by means of the current of air. Thus, the cooling effect can be improved. Since the case 2 itself has a round external shape as a whole, moreover, its corner portions cannot easily catch clothes or the like during operation using the power tool. Since the case 2 has no angled portions, moreover, it can enjoy a solid structure that is subject to only minor local stress concentration if it is dropped.

If the inner and outer wall portions 21 and 22 of the case 2 are tapered so that the case 2 widens toward its top opening, as shown in FIGS. 12 and 13, for example, the case 2 can be easily released from molds during injection molding operation. The necessary taper angle ranges from about 0.5° to 5°. The tapered structure facilitates the storage of the battery cells 1 if the depth of the trough is equal to the height of each battery cell 1. Since the respective positions of the battery cells 1 in the trough are regulated by means of bosses 25 or the like, moreover, the cells 1 can be effectively restrained from becoming shaky. Thus, the storage of the battery cells 1 can be kept steady despite the use of the simple structure, and the resulting battery pack enjoys good strength.

Figure 15:
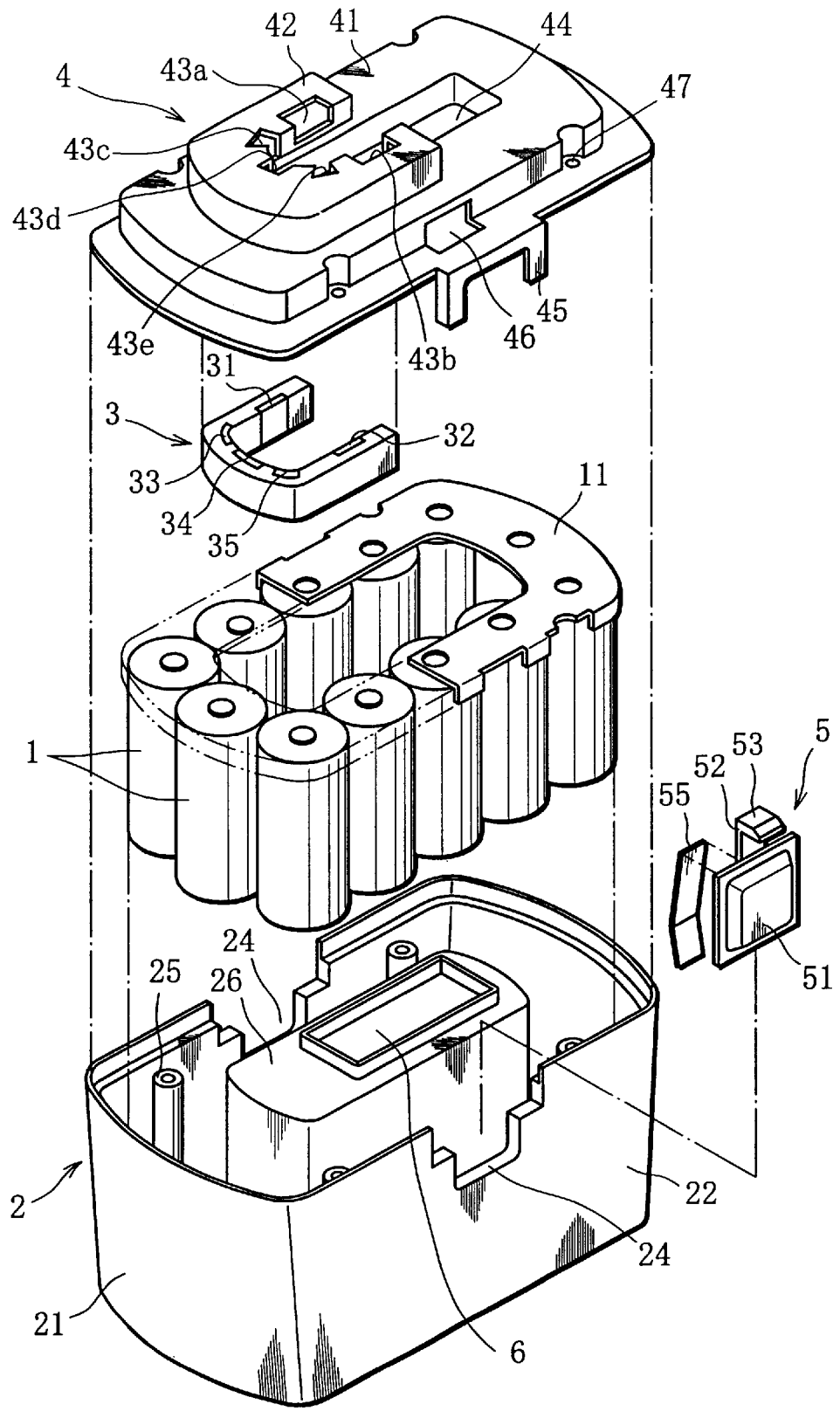
FIG. 15 is an exploded perspective view showing an outline of a battery pack according to a second embodiment of the invention.

As shown in FIG. 15, electrodes of a battery pack may be directed toward a hollow 6. More specifically, a pair of electrode lead terminals 31 and 32, positive and negative, are provided on the inside of the opposite side portions of a terminal block 3 in the form of a substantially U-shaped block, and three auxiliary terminals 33, 34 and 35 are provided in a curved inside portion that extends in the crosswise direction and connects the opposite side portions. The electrode lead terminals 31 and 32 and the auxiliary terminals 33, 34 and 35 are exposed to the hollow 6 through their corresponding apertures 43 (43*a*, 43*b*, 43*c*, 43*d* and 43*e*) that are arranged along the inner peripheral portion or the opening edge portion of a lid 4.

With this construction in which the electrode lead terminals 31 and 32 and the three auxiliary terminals 33, 34 and 35 are directed inward or toward the hollow 6, external impact, if any, on a projection 42 of the lid 4 never directly influences the terminals 31 to 35. Thus, the terminals 31 to 35 can be protected effectively. Besides, the terminals 31 to 35 face the inside of the case 2. If a metallic tool or the like touches the battery pack, therefore, it never comes directly into contact with any of the terminals 31 to 35. In other words, no foreign matter (tool or the like) can touch any of the terminals 31 to 35 unless the tool or the like is intendedly inserted into the hollow 6. Thus, the terminals 31 to 35 can be protected effectively and prevented from undergoing unexpected short-circuiting between them.

Figure 16:
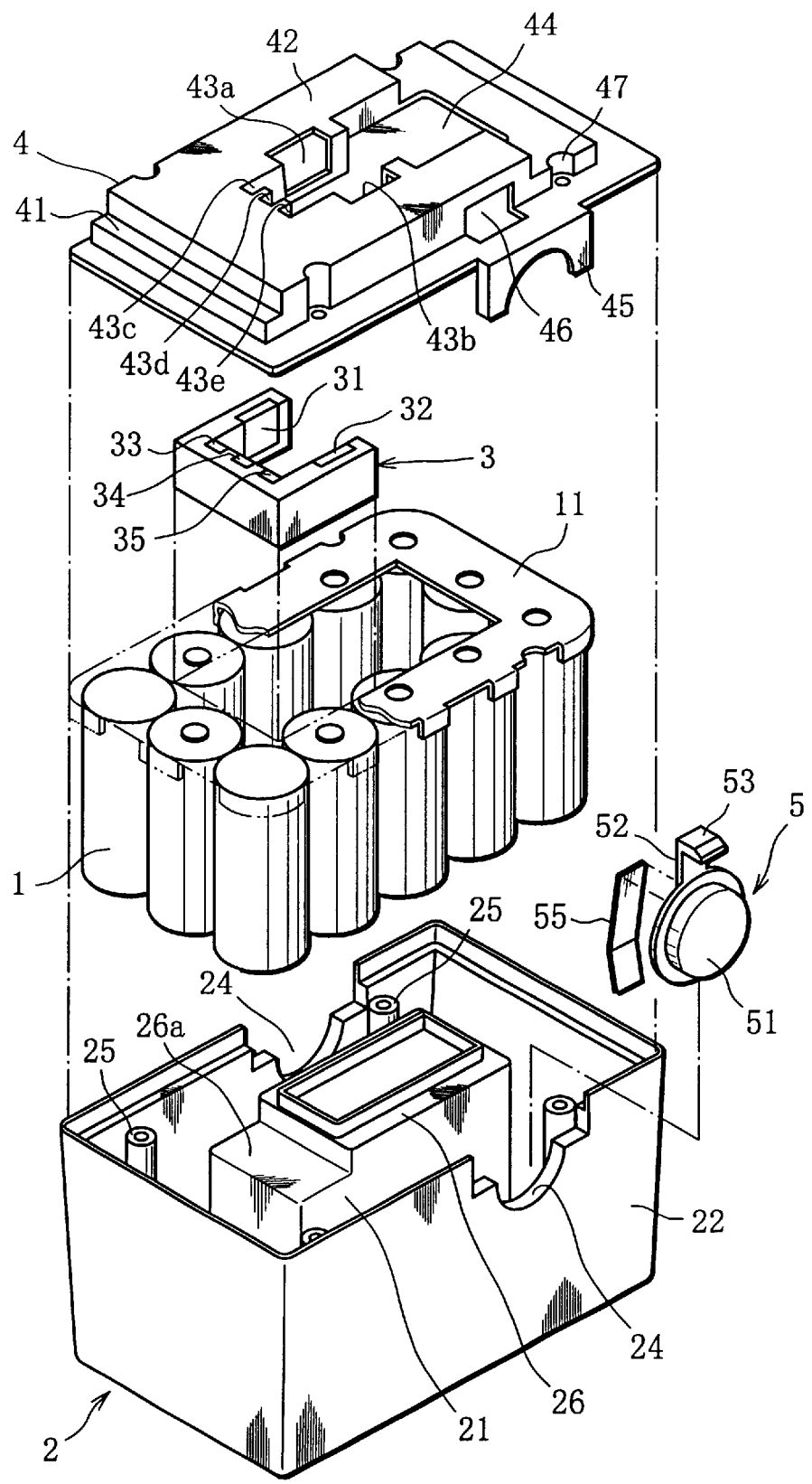
FIG. 16 is an exploded perspective view showing an outline of a battery pack according to a third embodiment of the invention.

As shown in FIG. 16, a case 2 may be formed having a substantially rectangular shape. As shown in FIG. 16, moreover, the top surface of a lid 4 may be flattened so that a terminal block 3 can be located over the inside of a row of battery cells. In this case, it is advisable to form a step portion 26*a* on a flange 26 that projects from the upper end portion of an inner wall portion 21 toward a hollow 6 and use the step portion 26*a* to support the terminal block 3 in a position recessed from its top surface.

Figure 17:
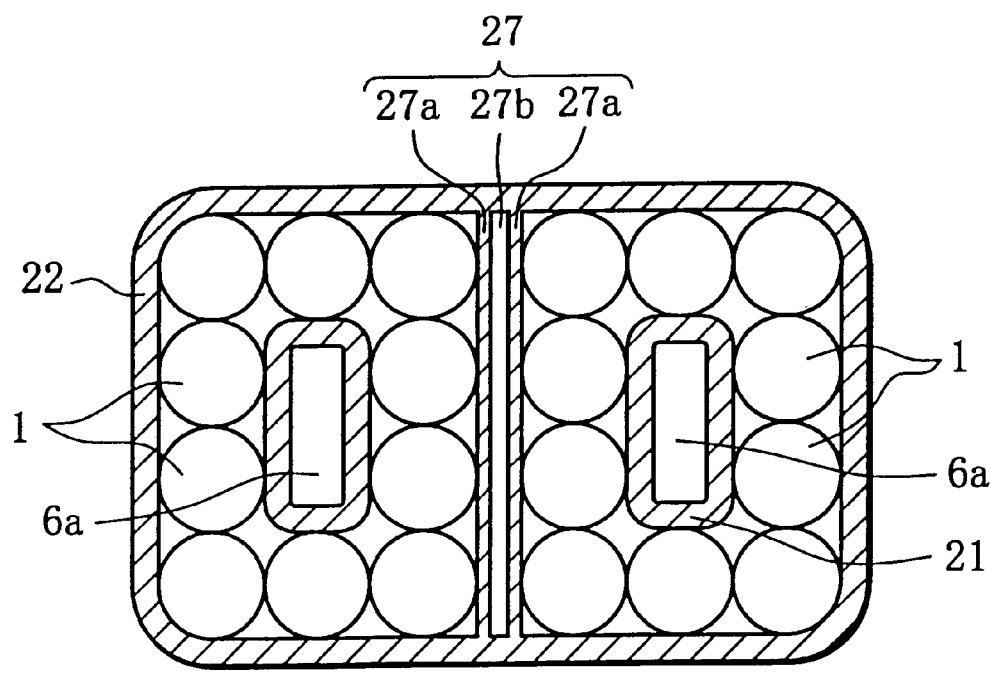
FIG. 17 is a view showing another configuration of the battery pack of the invention.

Alternatively, a plurality of battery packs, each including a plurality of battery cells 1 arranged in a loop in a trough-shaped cell storage space defined between inner and outer wall portions 21 and 22, may be stored side by side in a case 2 to form a large-scale (large-capacity) battery pack. In this case, the outer wall portion 22, which forms an outer wall of the case 2, is provided with a partition wall 27 for dividing the internal space of the case 2, as shown in FIG. 17, for example. Further, the inner wall portion 21, which is combined with the outer wall portion 22 and the partition wall 27, is located in each of spaces that are divided by the wall 27. Looped spaces defined by the outer wall portion 22, partition wall 27, and inner wall portions 21 are used as trough-shaped cell storage spaces, while central spaces surrounded by the inner wall portions 21 serve as hollows 6*a* that are open from top to bottom. Thus, two looped or trough-shaped cell storage spaces are formed side by side in the case 2.

Figure 18:
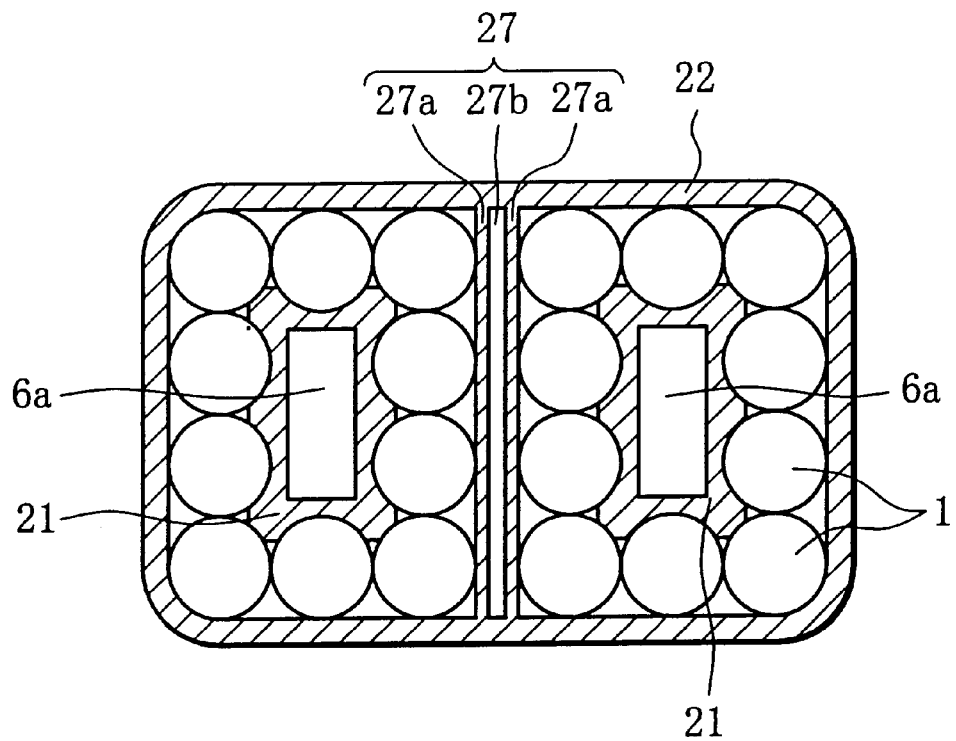
FIG. 18 is a view showing still another configuration of the battery pack of the invention.

Ten battery cells 1 are stored in a loop in each of the cell storage spaces with their respective peripheral surfaces in contact with one another. Preferably, in this case, the contact area should be increased in a manner such that the battery cells 1 are in contact with the inner wall portions 21, outer wall portion 22, or partition wall 27 and that the curvature of each corner of the outer wall portion 22 is equal to that of each battery cell 1. As shown in FIG. 18, moreover, the respective inner surfaces of the inner wall portions 21 should preferably be undulated so that they can be widely in plane contact with the respective outer peripheral surfaces of the battery cells 1. Preferably, furthermore, the partition wall 27 should be designed so that two partition wall plates 27a, for example, are arranged with a given gap 27b between them such that heat transfer can be prevented between the battery cells I that adjoin one another across the partition wall 27.

With this arrangement, even those battery cells 1 which are arranged in the central portion of the case 2 at a distance from the outer wall portion 22 never fail to come into contact with one of the two inner wall portions 21, and heat can be released through the hollows 6a that are surrounded by the inner wall portions 21. Thus, the temperature of the cells 1 can be effectively restrained from rising. Even in the case where a large number of battery cells 1 are stored in the one case 2, this arrangement can effectively restrain the temperature rise of the cells 1 without increasing the external dimensions of the case 2. Since the partition wall 27 supports the outer wall portion 22 from the inside, moreover, it also serves to enhance the mechanical strength of the case 2.

In the examples shown in FIGS. 17 and 18, the internal space of the case 2 is divided in two by using the partition wall 27. Alternatively, however, the internal space of the case 2 may be divided in four by means of two partition walls 27 that cross each other. In this case, the inner wall portion 21 is formed to define a looped cell storage space for each divisional space. Further, a plurality of cases 2 of this construction may be vertically stacked in layers with their respective hollows 6 in alignment so that a battery pack with a larger capacity can be obtained. The battery pack of this capacity can be utilized as a backup power source for various electronic apparatuses.

The present invention is not limited to the embodiments described above. For example, the type and number of battery cells 1 to be stored in the case 2 should only be settled depending on the necessary specifications of the battery pack. It is to be understood, moreover, that a battery pack with an increased current capacity may be obtained by suitably connecting a plurality of battery cells 1 in parallel with one another. Further, more temperature protection elements (thermostats) may be arranged along looped battery cells 1. The number of loops formed in the case is not particularly limited either. Furthermore, various changes and modifications may be effected in the invention by one skilled in the art without departing from the scope or spirit of the invention.

What is claimed is:

1. A battery pack comprising:
    a plurality of battery cells; and
    a case for storing the battery cells side by side, the case including a bottomed trough and a lid, the trough having a space as a cell storage portion defined between inner and outer wall portions paired to form a loop and a central space as a hollow surrounded by the inner wall portion and penetrating the trough from top to bottom, the lid closing a top opening of the cell storage portion, wherein:
    each of the battery cells is in contact with at least the inner and outer wall portions of the trough, so that heat generated in the battery cells is released through the trough.

2. The battery pack according to claim 1, wherein said trough is designed so that the pillar-shaped battery cells stored in the cell storage portion are arranged side by side in a loop with the respective outer peripheral surfaces thereof in contact with one another.

3. The battery pack according to claim 1 or 2, wherein each said battery cell is a nickel-metal hydride secondary battery cell.

4. A battery pack having a plurality of battery cells stored in a case, said case including a bottomed trough and a lid, the trough having a space as a cell storage portion defined between inner wall portions and outer wall portions paired to form a loop and essential space as a hollow surrounded by the inner wall portion and penetrating the trough from top to bottom, the loop closing a top opening of the cell storage portion,
    the battery pack further comprising a terminal block overlying the battery cells stored in the cell storage portion of the trough and having electrode leads of the group of battery cells led out therefrom, and wherein said lid has apertures in those regions thereof which face the electrode leads, through which the electrode leads are exposed for external connection.

5. The battery pack according to claim 4, wherein said terminal block has a region thereof disposed to face the hollow, said electrode leads being provided in said region of said terminal block, and said apertures through which the electrode leads are exposed for external connection are arranged along the inner peripheral portion of the lid opposite the hollow.

6. The battery pack according to claim 4 or 5, wherein said terminal block is provided with a pair of electrode lead terminals, positive and negative, connected individually to the electrode leads of the cell group and one or a plurality of auxiliary terminals for the cell group.

7. The battery pack according to claim 6, wherein said auxiliary terminals are used when the cell group is charged and include a terminal for charging connected in series with the cell group through temperature protection elements for cutting off a charging path for the cell group in response to the temperature of the cells, a terminal for temperature detection connected to a temperature transducer for detecting the cell temperature, and a terminal for cell type identification connected to a resistor having a resistance value corresponding to the specifications of the cells.

8. The battery pack according to claim 7, wherein said temperature protection elements are provided individually in a plurality of spots in the direction of arrangement of the battery cells stored in a loop in the cell storage portion of the trough and are interposed in series between the cell group and the charging terminal.

9. A battery pack having a plurality of battery cells stored in a case,
    said case including a bottomed trough and a lid, the trough having a space as a cell storage portion defined between inner wall portions and outer wall portions paired to form a loop and essential space as a hollow surrounded by the inner wall portion and penetrating the trough from top to bottom, the loop closing a top opening of the cell storage portion, wherein:
    the inner wall portions of said trough is inclined outward from the base portion thereof to the top opening, whereby the sectional area of the top opening of the hollow surrounded by the inner wall portion is reduced.

10. The battery pack according to claim 9, wherein said inner wall portion is inclined at an angle of 0.5° to 5° to the vertical direction.

11. The battery pack according to claim 1, wherein the inner and outer wall portions of said trough are as high as the cylindrical battery cells.

12. A battery pack having a plurality of battery cells stored in a case, said case including a bottomed trough and a lid, the trough having a space as a cell storage portion defined between inner wall portions and outer wall portions paired to form a loop and essential space as a hollow surrounded by the inner wall portion and penetrating the trough from top to bottom, the loop closing a top opening of the cell storage portion, wherein:

a plurality of said inner wall portions are formed defining a plurality of looped cell storage portions between the inner and outer wall portions and individually defining hollows surrounded thereby.

13. A power tool fitted with the battery pack according to claim 1 as a power source thereof.

14. The power tool according to claim 13, which comprises a motor rotatable by means of the battery pack as the power source and a mechanism for circulating air in the hollow surrounded by the inner wall portion of the trough by utilizing the rotation of the motor.

15. The battery pack according to claim 1, wherein said inner wall portions are formed of a metallic material that has a high heat transfer coefficient.

16. The battery pack according to claim 1, wherein said inner wall portions are formed of a resin material and each have a surface thereof coated with a high heat transfer paint.

* * * * *